(12) United States Patent
Myers

(10) Patent No.: US 9,850,395 B2
(45) Date of Patent: Dec. 26, 2017

(54) POLYMER COATED METALLIC SUBSTRATE AND METHOD FOR MAKING

(75) Inventor: Frederick Alan Myers, Middletown, OH (US)

(73) Assignee: AK STEEL PROPERTIES, INC., West Chester, OH (US)

( * ) Notice: Subject to any disclaimer, the term of this patent is extended or adjusted under 35 U.S.C. 154(b) by 382 days.

(21) Appl. No.: 12/830,618

(22) Filed: Jul. 6, 2010

(65) Prior Publication Data

US 2011/0008615 A1    Jan. 13, 2011

Related U.S. Application Data

(60) Provisional application No. 61/223,541, filed on Jul. 7, 2009.

(51) Int. Cl.
   *C09D 5/26* (2006.01)
   *C09D 133/00* (2006.01)
   (Continued)

(52) U.S. Cl.
   CPC .......... *C09D 133/00* (2013.01); *C08K 3/0008* (2013.01); *C08K 5/0008* (2013.01);
   (Continued)

(58) Field of Classification Search
   CPC ............ Y10T 428/256; Y10T 428/265; C09D 135/06; B32B 15/08
   (Continued)

(56) References Cited

U.S. PATENT DOCUMENTS 3,238,168 A    3/1966  Wolff et al.
3,801,550 A    4/1974  Adelman
(Continued)

FOREIGN PATENT DOCUMENTS

JP    2004-291445 A    10/2004
JP    2007-098582 A    4/2007
(Continued)

OTHER PUBLICATIONS

European Patent Office Communication, dated Dec. 9, 2013 for Application No. EP 10731891.7, Third Party Observation for Application No. EP 20100731891 submitted on Nov. 27, 2013 by anonymous.
(Continued)

*Primary Examiner* — Samir Shah
(74) *Attorney, Agent, or Firm* — Frost Brown Todd LLC

(57) ABSTRACT

A composite material comprising a metallic substrate and a coating on at least one side of the metallic substrate, wherein the coating comprises an acrylic or styrene-acrylic based polymer and is less than about 0.2 mils thick, wherein the polymer has a molecular weight of 50,000 to 1,000,000, a glass transition temperature (Tg) of 50-80° C., and comprises 90-100 wt. % of the total solids in the coating. The method of applying a coating to a metal substrate using a manifold flood and squeegee roll configuration or alternatively roll coater techniques; wherein the roll hardness, shape, pressure and speed are chosen to ensure that the coating composition forms a continuous wet film on the metallic substrate surfaces when the strip travels at up to 600 feet per minute; and the wet film has a uniform thickness of 2 mil (0.002 inch) or less.

13 Claims, 1 Drawing Sheet

(51) Int. Cl.
*C09D 133/08* (2006.01)
*C09D 135/06* (2006.01)
*C08K 3/00* (2006.01)
*C08K 5/00* (2006.01)
*C09D 125/08* (2006.01)

(52) U.S. Cl.
CPC ......... *C09D 125/08* (2013.01); *C09D 133/08* (2013.01); *C09D 135/06* (2013.01); *Y10T 428/256* (2015.01); *Y10T 428/265* (2015.01)

(58) Field of Classification Search
USPC ........................................................ 428/457
See application file for complete search history.

(56) References Cited

U.S. PATENT DOCUMENTS

| | | | |
|---|---|---|---|
| 4,070,510 | A | 1/1978 | Kahn |
| 4,098,951 | A | 7/1978 | Wolff |
| 4,288,357 | A | 9/1981 | Kanazawa |
| 4,294,939 | A | 10/1981 | Taniguchi |
| 5,085,696 | A | 2/1992 | Muller |
| 5,254,619 | A | 10/1993 | Ando |
| 5,580,933 | A | 12/1996 | Verge |
| 5,612,136 | A | 3/1997 | Everaerts |
| 5,783,303 | A | 7/1998 | Tsuei |
| 5,783,622 | A | 7/1998 | Sabata et al. |
| 5,795,649 | A | 8/1998 | Cosentino |
| 5,922,475 | A | 7/1999 | Barancyk |
| 6,608,143 | B1 | 8/2003 | Fukuoka |
| 6,620,890 | B1 | 9/2003 | Yamashita |
| 6,673,453 | B2 | 1/2004 | Beavers |
| 6,758,916 | B1 | 7/2004 | McCormick |
| 6,875,479 | B2 | 4/2005 | Jung |
| 7,063,895 | B2 | 6/2006 | Rodriques et al. |
| 7,179,404 | B1 | 2/2007 | Viswanathan |
| 7,232,479 | B2 | 6/2007 | Poulet |
| 2002/0037403 | A1 | 3/2002 | Yoshida |
| 2002/0114884 | A1 | 8/2002 | Friedersdorf et al. |
| 2005/0004302 | A1 | 1/2005 | Szmanda |
| 2006/0100353 | A1* | 5/2006 | Barsotti et al. ............... 524/543 |
| 2006/0233955 | A1* | 10/2006 | Smith .................... C09D 5/002 427/299 |
| 2007/0172593 | A1 | 7/2007 | Sinsel et al. |
| 2008/0131606 | A1 | 6/2008 | Trogolo |
| 2008/0249207 | A1* | 10/2008 | Whiteley et al. ............. 523/122 |

FOREIGN PATENT DOCUMENTS

| | | |
|---|---|---|
| WO | WO 97/08260 | 3/1997 |
| WO | WO 99/29795 | 6/1999 |
| WO | WO 03/011583 | 2/2003 |
| WO | WO 2007/008580 | 8/2007 |

OTHER PUBLICATIONS

Abstract for Handbook of Environmental Degradation of Materials, William Andrew Inc. (2005) Chap. 18.
Abstract for Mueller, B. et al., "Corrosion inhibition of copper and brass pigments in aqueous alkaline media by copolymers," Progress in organic coatings, vol. 37(3-4) (1999) pp. 193-197.
Abstract for Steel Dynamics, http://news.thomasnet.com/companystory/475809.
Williams, D. et al, Guide to Cleaner Technologies: Organic Coating Replacements, Diane Publishing (1994) pp. 1-91.
Database WPI Week 200934 Thomson Scientific, London, GB; AN 2009-G35736 & CN 101 392 136 A (Shenzhen Haichuan Ind Co Ltd) Feb. 25, 2009.
Database WPI Week 200940 Thomson Scientific, London, GB; AN 2009-G78037 & CN 101 392 136 A (Shenzhen Haichuan Ind Co Ltd) Mar. 25, 2009.
International Preliminary Report on Patentability for Application No. PCT/US2010/041041 dated Jan. 19, 2012.

* cited by examiner

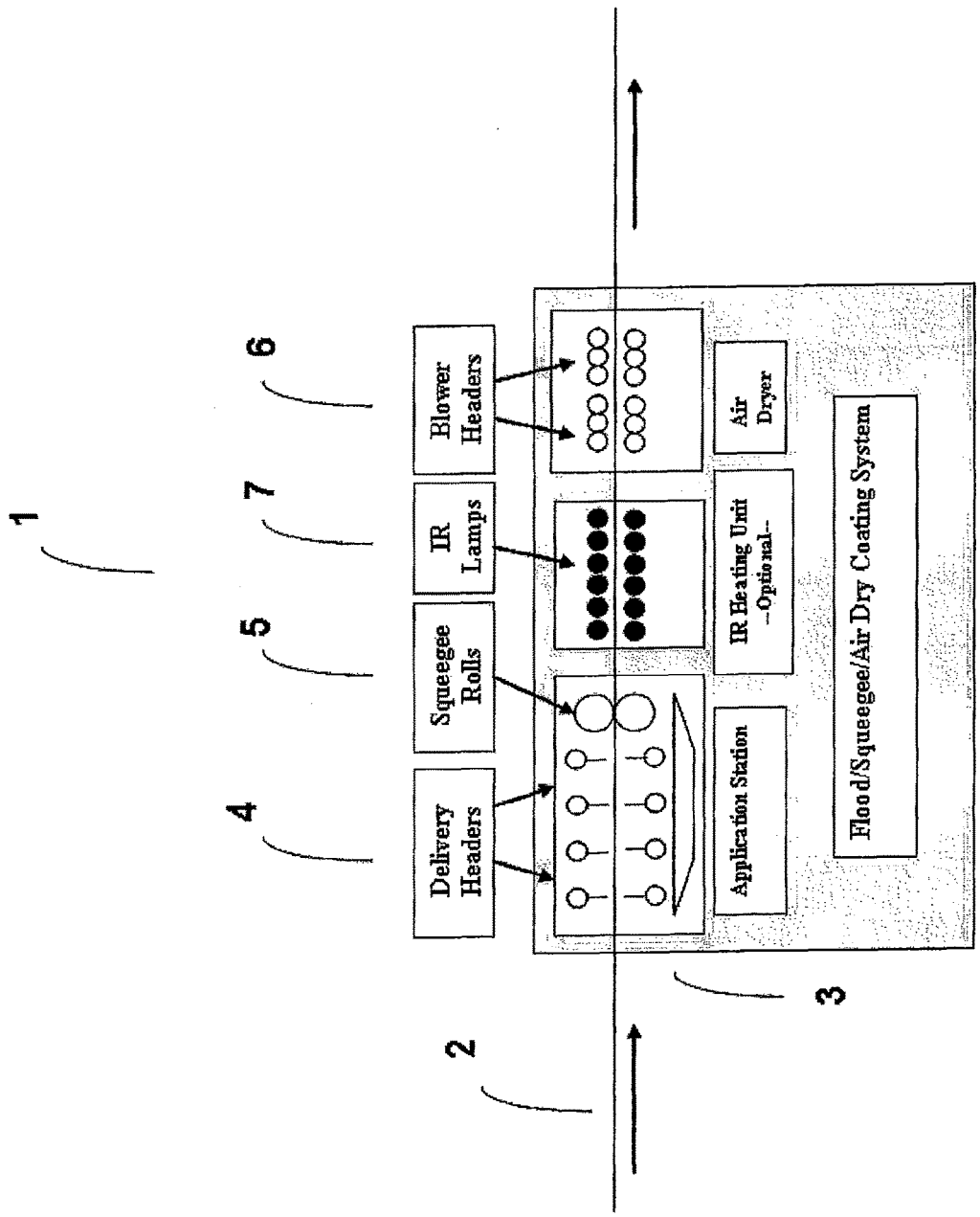

POLYMER COATED METALLIC SUBSTRATE AND METHOD FOR MAKING

CROSS REFERENCE TO RELATED APPLICATIONS

The present application hereby claims the benefit of the provisional patent application Ser. No. 61/223,541, filed on Jul. 7, 2009, the disclosure of which is hereby incorporated by reference in its entirety.

FIELD OF THE INVENTION

The present application relates to metal production. In particular, it relates to a polymer coating composition, a method for applying this coating to a metal substrate to form a continuous film and the subsequent performance of the metal/polymer composite material.

BACKGROUND

Coatings are often applied to steel prior to coiling. These systems may be applied in order to prevent corrosion of the steel during shipping and processing and to act as lubricants when the steel is formed. Two types of coatings commonly used to coat steel prior to coiling are: (1) liquid coatings and (2) cured dry film coatings. Each of these coatings may have certain drawbacks. Liquid oil type coatings may be messy, in part because they migrate and flow under pressure. This decreases their ability to protect the metal during storage or shipping and limits the performance of the metal during fabrication processes such as stretching, bending and drawing. Liquids may also become airborne and create environmental concerns related to clean-up/disposal and worker safety. Cured dry film coatings are polymers that require a chemical reaction typically performed at elevated temperature that is time-consuming and expensive. Ovens are expensive and require a large footprint on high speed metal processing lines. In many cases the coating material is dissolved in an environmentally restricted solvent that is evaporated during the heating process required for curing. The evolved solvents need to be incinerated or otherwise contained in order to meet environmental constraints. Other types of coatings that are applied to metals are non film forming systems such as chromates, phosphates and silanes. These may involve the use of hazardous chemicals, complex processing steps or are limited to specific applications. In many cases, the coatings discussed above are applied during operations separate and subsequent to normal mill processing thereby resulting in increased operational and transportation costs.

BRIEF SUMMARY

A composite material comprising a metallic substrate and a coating on at least one side of the metallic substrate, wherein the coating comprises an acrylic or styrene-acrylic based polymer and is less than about 0.2 mils thick, wherein the polymer has a molecular weight of 50,000 to 1,000,000, a glass transition temperature (Tg) of 50-80° C., and comprises 90-100 wt. % of the total solids in the coating.

The method of applying a coating to a metal substrate using a manifold flood and squeegee roll configuration or alternatively roll coater techniques; wherein the roll hardness, shape, pressure and speed are chosen to ensure that the coating composition forms a continuous wet film on the metallic substrate surfaces when the strip travels at up to 600 feet per minute; and the wet film has a uniform thickness of 2 mil (0.002 inch) or less.

These and other objects and advantages shall be made apparent from the accompanying drawings and the description thereof.

BRIEF DESCRIPTION OF THE FIGURES

It is believed the present application will be better understood from the following description taken in conjunction with the accompanying FIGURES. The FIGURES and detailed description that follow are intended to be merely illustrative and are not intended to limit the scope of the invention.

FIGURE depicts a schematic diagram showing an exemplary system for coating a metal strip.

DETAILED DESCRIPTION

The following description of certain examples of the current application should not be used to limit the scope of the present application. Other examples, features, aspects, embodiments, and advantages of the application will become apparent to those skilled in the art from the following description. Accordingly, the FIGURES and description should be regarded as illustrative in nature and not restrictive.

The current technology addresses environmental and hazardous chemical problems by using a water based polymer system that may be rapidly dried at ambient temperatures on existing high speed steel processing lines. It may be chemically tailored to meet the end use requirements of many of the current liquid, cured dry film, and non-film forming coatings including corrosion protection and customer processing enhancements. This polymer based coating may be applied in a cost effective manner on existing mill processing lines using procedures similar to that used for oils/lubes. Expensive application and cure equipment is not required. Since water is the major component, environmental issues are minimized. The resulting product is a polymer/metal composite material that may be processed using conventional stretching, drawing, bending, welding and painting techniques associated with metal fabrication. The composite material allows the metal component of the composite to perform at a level commensurate with its inherent properties without the limitations imposed by conventional metal lubricating systems that may lead to galling, scaling, powdering or flaking during typical metal processing operations. The use of the composite material also minimizes the need for rough metal surface textures needed to hold liquid based oils during forming of conventional metal materials. Smoother surfaces may result in improved paint appearance on surface critical items such as the exterior panels of automobiles and appliances.

A dry, continuous polymer film on the surface of the strip may be formed in the mill that can be chemically modified to provide specific properties such as corrosion, antimicrobial, antifingerprint, or antioxidation protection, as well as formability enhancements. This system can be applied on existing high speed mill processing lines using relatively inexpensive flood and squeegee techniques. Since curing reactions are not required, the water based system is dried using small footprint hot air dryers instead of large curing ovens. Since water is the major fugitive component of the system, environmental restrictions during processing are minimized. Eliminating the need for additional processing steps possibly at outside processors as well as the need for expensive application/cure equipment greatly lowers the cost of applying these desirable material performance enhancement coatings. The resulting polymer-metal composite may be processed using conventional sheet/strip forming, joining, and finishing techniques currently utilized by the automotive, appliance and HVAC industries. These coatings therefore improve the performance of the resulting metal component of the polymer metal composite without significantly increasing costs.

The coating may enhance the formability of the metal strip by minimizing metal to metal contact thereby allowing the material to perform at a level consistent with its inherent mechanical properties. This reduces or eliminates the need for additional liquid type forming or stamping lubricants which are not ecologically friendly and by their physical nature as incompressible liquids likely to limit the performance of the material since they flow away from the critical high pressure areas. Use of the coating may also reduce damage to metal forming dies and thereby improve press uptime. The coating may be easily removed from the metal; however, it may also be formulated to remain on the finished part to act as a pretreatment or primer for subsequent operations such as painting.

One embodiment of the coating contains an acrylic or styrene-acrylic polymeric water-based dispersion or emulsion. Examples are the SYNTRAN or Magatran polymers from Interpolymer Corporation or the DURAPLUS and DURAGREEN polymers from the Rohm and Hass division of Dow Chemical. Typical polymers include those derived from acrylate, methacrylate and styrene monomers. The chemistries and concentrations of the polymers or copolymers are chosen to affect durability, hardness, gloss, and removability of the coating. In one embodiment, the polymers are not crosslinked.

In one embodiment, the polymers have a molecular weight of greater than 50,000. The molecular weight may be from 100,000 to 1,000,000. There may also be lower molecular weight oligomers of similar chemistry present. The polymers are the main film forming ingredient in the coating, and are present at a level between 50-95%, greater than 80%, or between about 90% and 100% of the solids components of the coating. The glass transition temperature (Tg) of the polymers may be less than 80° C., in the range of 50° C. to 80° C., or in the range of 50° C. to 70° C.

In one embodiment, the coating may have one or more of these attributes; the ability to be applied as a uniform liquid film on the surface of a moving metal strip; dried rapidly using air blowers with minimal non-aqueous based emissions; and form an adherent, tough, durable continuous dry film that enhances the corrosion and forming performance of the substrate. The chemistries and concentrations of the polymers or copolymers may be chosen to affect durability, hardness, leveling, gloss, coefficient of friction, removability, etc. To optimize these properties and tailor the coating for specific applications, several additional components may be added.

In one embodiment, prior to drying the coating composition to form the coating, the polymers are in an emulsion or dispersion where the size of the spherical particles may be less than 1 micron. They may have a size of 0.1 to 0.5 microns. The coating composition is typically more than 60% water. It may be between 70 and 85% water. The dispersion/emulsion viscosity may be less than 200 centipoise. It may be from 20 to 100 centipoise.

In one embodiment a plasticizer may be added to assist in forming a continuous film at temperatures as low as 10° C. The plasticizer remains as part of the final coating and is typically selected from phosphate esters, phthalate esters, benzoic acid esters, or fatty acid esters. An example of a plasticizer for acrylic or styrene acrylic copolymer based systems is tributoxyethyl phosphate. Plasticizers may be present between from 0 to 25% of the solids. Typically plasticizers are present at less than 5% of the solids.

In one embodiment a coalescing agents based on alkyl or aromatic ethers of ethylene glycol or propylene glycol such as diethylene glycol ethyl ether may be added to also assist in the formation of a continuous film. These additives have vapor pressures of 0.1 to 1.0 mm Hg at room temperature and are typically fugitive and don't remain with the final polymer. Both plasticizers and coalescing agents are chosen based on their oil/water solubility (hydrophobic-hydrophilic balance). Coalescing agents may be added in the range of 0-25% of solids to provide a desired property. Typically coalescing agents are present at less than 5% of the solids.

In one embodiment the liquid dispersion/emulsion may contain anionic or nonionic surfactants or wetting agents such as the fluorosurfactants based Masurf systems from Mason Chemical or Zonyl systems from DuPont, which typically reduce the surface tension to 50 dynes/cm or less, or 30 dynes/cm or less. These may be added at a level of 0-5%, or less than 1% of the total solids.

In one embodiment a defoamer, such as one of the silicone based SE series from Wacker Chemical, may be included at a level of less than 0.01%, or about 0.004 to about 0.005%. The formulation may contain paraffin, polyethylene, polyolefin or other wax type additives such as the A-C series from Honeywell or the Epolene series from Eastman Chemical not more than about 10%, or not more than about 5% total solids level to provide durability to the dried coating. These additives may have a molecular weight of 1000 to 5000.

In one embodiment alkali soluble resins (ASR) also known as leveling agents may be added at up to about 10%, or up to about 5% of total solids to enhance gloss, leveling characteristics, and removability of the coating. ASRs may have a molecular weight of 500 to 2000 and an acid number of 150-250. ASRs are chosen from the group of rosin adducts, acrylic resins, and styrene/maleic anhydride resins. A typical system would be the Michem MD-91530 acrylic resin dispersion.

In one embodiment polyvalent metal ions may be added to aid durability and removability. Examples of a polyvalent metal ions include zinc oxide based systems such as Chemcor ZAC products. Biocides and antimicrobial type additives, such as those from Agion Technologies, containing silver ions, may also be added to the dispersion/emulsion both to control the growth of microorganisms in the liquid during storage and to protect the coated surfaces of the final composite product. The coating composition may be modified to provide antifingerprint benefits to the resulting polymer/metal composite. Cesium, lanthanum zirconium, titanium, silicon or other rare earth type nano-particle additives may be included to impart oxidation/corrosion improvements to the final polymer/metal composite.

The final combination of the various components of the coating represents a balancing between the desired film properties such as hardness, coefficient of friction, gloss, etc and the ability to form a continuous film under the conditions associated with high speed metal processing lines. The liquid coating composition is applied to moving strip at room temperature. After drying, the coating forms an adherent dry, continuous polymer film on the surface of the metal strip. The final dry coating thickness may be less than 0.2 mils (0.0002 inches), or 0.05-0.1 mils (0.00005 to 0.0001 inches). Alternatively, the typical coating weight of the dried coating may be less than 400 mg/sq ft, or in the range of 150-250 mg/sq ft.

The amount of tackiness may be minimized to eliminate the possibility of blocking when the strip is subsequently coiled. The solid, continuous polymer film may eliminate the migration associated with liquid oil based coatings. The coating may be clear or color tinted. In one embodiment, it provides a reduced friction coefficient of less than 0.2, or 0.05-0.15. This reduces constraints associated with surface friction effects during forming operations. In one embodiment, the coating provides a minimum surface pencil hardness value of H in order to minimize pick-off when in contact with die surfaces. The resulting polymer/metal composite may attain a 0-T or 1-T bend radius without surface cracking or powdering and there is no removal of the coating during adhesive tape pull after cross hatch scribing. These attributes may also ensure the integrity of the polymer/metal bond and therefore minimize loss of the coating during processing.

The dried coating may be easily removed from the metal strip by cleaning methods known in the art, for example by using well-known alkaline cleaners or solvents such as acetone. The dried coating may also be left on the strip. The dried coating may also be applied on the surface of a strip (2) to act as a primer for subsequent operations, such as painting or coating. It is well known by those skilled in the art that various paints and coatings are applied to steel for numerous reasons. In view of this use, the dried coating may act as a primer in preparation for subsequent painting or other coatings. A strip coated with this system may also be welded using standard welding process procedures.

The coating may be applied to bare steel, such as stainless, carbon, or electrical steel. It may also be applied to metal coated steel, such as aluminized steel or galvanized steel. The coating may also be applied to non-ferrous metals, such as aluminum.

One method of applying the liquid coating composition is the flood and squeegee method. The liquid coating composition may be applied at a wet film thickness of 2 mil (0.002 inch) or less, or from about 0.5 to 1.0 mils. The thickness is controlled in part by varying the ratio of polymer to water and the level of the various compositional components. These factors will influence the application viscosity. The applied coating may have a volatile organic compound (VOC) level of 0.5 lb/gal or less and an applied viscosity of less than 250 centipoise, or 20-100 centipoise. Roll pressure, roll hardness, and roll geometry as well as the metal surface characteristics such as surface roughness may also influence coating thickness. More expensive conventional rolls coaters may also be used to apply the coating to moving strip. However the characteristics of the coating do not require this approach.

In one embodiment the liquid coating may be air dried, without the need for curing. In other words, there is no elevated temperature chemical reaction, such as cross-linking, that occurs as the coating dries. Convection ovens or induction heating units are not required to achieve the desired properties even at the high process speeds (50-600 ft/min) encountered in metal processing lines. Therefore the drying footprint of the process is minimized.

In one embodiment the drying may be accomplished by any methods known in the art, including hot air blowers or infrared radiation. The coating system may also be chemically configured to permit drying using ultraviolet radiation. In one embodiment, the drying occurs at a peak metal temperature of 110° F. or less. In one embodiment, the drying time is 5 seconds or less.

In one embodiment a metal strip is coated with an aqueous acrylic or styrene-acrylic copolymer dispersion (shown in FIGURE). A metal strip (2) is coated with SYNTRAN® AX-270-LFHS acrylic co-polymer dispersion while the metal strip (2) passes through the application station (3). SYNTRAN® AX-270-LFHS acrylic co-polymer dispersion is manufactured by Interpolymer Corporation having an address at 200 Dan Road, Canton, Mass., 02021. The polymers in the liquid coating have a molecular weight of less than 1,000,000. The coating composition has sodium lauryl sulfate type surfactants added at the level of less than 2% by weight to aid wetability. The water based dispersion has a viscosity of less than 250 centipoise.

Other suitable substances that may be used to coat a metal strip include: FUTURE® Floor Finish, produced by SC Johnson Company having an address at 1525 Howe Street, Racine, Wis., 53403; and QUICK SHINE® Floor Finish, produced by Holloway House Incorporated having an address at 309 Business Park Drive, Fortville, Ind., 46040; and the DURAPLUS/DURAGREEN systems from the Rohm and Haas division of Dow Chemical Company, Midland, Mich. Other substances may be used that form a thin, flexible plastic film by drying onto a metal strip and at least protect the steel strip from corrosion. Upon drying, these coatings will provide the surface of the strip with a coefficient of friction approximately equal to or less than 0.5. In liquid form, the coating composition will include acrylic or styrene-acrylic copolymers having a molecular weight for example between 50,000 and 1,000,000 and viscosities for example between 50 and 200 centipoise. The coatings may contain additives to tailor the properties of the composite to specific needs such as antimicrobial protection, gloss, removability, toughness, color and durability.

FIGURE depicts an exemplary application process (1). In this example, process (1) involves passing a metal strip (2) free of dirt, oil, and other surface contaminants through an application system (3) where the liquid acrylic or styrene-acrylic co-polymer coating is flooded on one or both sides of the strip using one or more headers (4). The flooded strip then passes through squeegee rolls which limit the amount of coating that remains on the strip (5). Squeegee roll pressure, roll geometry and the roll material as well as the strip surface and polymer viscosity will affect the amount and uniformity of the liquid that remains on the strip. The remaining liquid polymer coating is dried with air blowers (6). Alternatively, the strip may be passed through an infrared radiation system that may aid in strip drying (7). This infrared system may be used by itself or in tandem with the air drying. Although not depicted, the coating may also be chemically modified so that the drying process is accomplished using ultraviolet radiation. Due to the low temperatures needed to dry the strip subsequent cooling or water quenching that is commonly used for cured coatings is not needed. The coated strip is then ready for further processing and coiling.

In one embodiment, the dried SYNTRAN AX-270-LFHS coating has a coating weight of 50-150 mg/sq ft and provides a coefficient of friction of less than 0.5. It further provides a minimum surface pencil hardness of H. The coating adheres sufficiently well to the metal that a 5B rating is achieved after cross hatch scribe testing according to ASTM D3359. After drying, the strip is able to be wound into a coil with no measurable blocking when subsequently unwound for further processing.

In one embodiment, using procedures described in ASTM D4145, the resulting metal/polymer composite may be bent to a 0T radius without peeling, flaking, or powdering when various substrates including galvannealed or stainless steel are used as the metal component. The resulting composite material may also be formed into modified Swift cups with a 1 inch deep draw without peeling, flaking, powdering, or galling of the sidewalls by the die surface. When the polymer component is removed, for instance using an alkaline cleaner, the remaining metal has a pristine surface that is therefore less susceptible to finishing and painting blemishes and defects. The cleaned surface readily accepts pre-treatments and paints.

In one embodiment, a water based acrylic polymer such as SYNTRAN AX-270-LFHS supplied by Interpolymer Corporation can be applied to moving strip on an existing metal processing line using flood/squeegee techniques where the wet film thickness is sufficient to result in a continuous tack free dry film thickness on one or both surfaces of 0.05-0.1 mils (0.00005-0.0001 in) or alternatively a coating weight of 150-250 mg/sq ft/side. This system can be tinted for identification purposes and may have additives that affect the coefficient of friction, corrosion, surface roughness and antimicrobial properties. Drying of the coating is accomplished using Hoffman type hot air dryers such that the temperature of the strip reaches 110-120° F. which is sufficient to result in a tack free surface thereby permitting subsequent strip processing such as temper rolling or coiling. The application/drying equipment is typically available on many existing high speed mill processing lines. Therefore additional operational and transportation costs are eliminated. The resulting composite is able to be formed into components such as those requiring stretching, bending or drawing without the use of conventional wet lubricants.

Percentages of ingredients described herein are weight percents.

Having shown and described various embodiments, further adaptations of the methods and systems described herein may be accomplished by appropriate modifications by one of ordinary skill in the art without departing from the scope of the application. Several of such potential modifications have been mentioned, and others will be apparent to those skilled in the art. For instance, the examples, embodiments, ratios, steps, and the like discussed above may be illustrative and not required.

EXAMPLES

Example 1

Panels of galvanized and galvannealed carbon steel, aluminized carbon, and stainless steel have been coated using laboratory draw down bars and roll coating equipment followed by air drying. This allowed coating procedures to be developed using various chemistries and roll configurations to verify performance. SYNTRAN systems from Interpolymer Corporation that were examined were AX-270-1, AX-270-5, AX270-7, AX-270-LF, and AX-270-HS. Variations included percentage of polymer in the aqueous solution and the effect of additives that would influence substrate wetting and solution foaming. These tests demonstrated that the system was able to be applied over a thickness range of 100-400 mg/sq ft, that rapid drying of <5 sec necessary for use on high speed mill processing lines could be achieved using minimal heat, that pencil hardness of >1H was obtainable along with resistance to blocking, that adequate substrate adhesion was achieved to permit one inch deep Swift cups to be drawn and 0-T and 1-T radius bends to be formed without cracking and to verify removability in industrial alkaline cleaners. Based on these tests, the SYNTRAN AX-270-LFHS system was developed.

Example 2

The SYNTRAN® AX-270-LFHS system was applied to moving strip on a continuous hot dip galvanizing line after application of the zinc coating. The galvanized strip thicknesses were 0.050-0.055 inch and the strip width was 38-41 inches. The speed of the moving strip in the constant speed process section of the line where the polymer dispersion was applied was 200-250 feet/min. The coating was applied using existing flood and squeegee equipment. Both sides of the strip were coated. The polymer dispersion was applied at the supplied viscosity of approximately 200 cps as well as at lower viscosities of 25-100 cps obtained by dilution with water. The dispersion was pumped from a holding drum through headers that extended across the horizontal strip and the flow was regulated so that a pool of the dispersion developed behind the squeegee rolls. In this trial the squeegee rolls rode on the strip and were not independently driven. The pressure on the rolls was adjusted to provide a uniform wet film on both surfaces across the entire width of the strip. Immediately after exiting the squeegee rolls, the coated strip passed through a series of plenums connected to Hoffman type air blowers. The time in the plenum section was <2 sec. After exiting the plenum area, the strip was dry, adherent and uniform in appearance. No pick-off of the coating was noted on subsequent processing rolls that contacted the strip. One of the coils was in-line temper rolled after exiting the coating application section with no degradation of the coating integrity. The coating weights were subsequently measured using weigh/strip/weigh techniques to be approximately 100 mg/sq ft/side. The material was subsequently wound into coils. After approximately 2 weeks, the coils were taken to an off-line operation where they were unwound. No coil blocking was detected. Samples were removed from the coils and were tested for formability. Approximately 1 inch deep modified Swift cups were able to be formed without flaking, peeling or powdering of the coating. The coating was also able to be sheared, bent and handled using procedures typical for metal strip. Pencil hardness was 2H. The 60 degree gloss as measured by a Byk Mirror gloss meter was greater than 300 for the bare galvanized surface and less than 300 for the coated surface. For the samples that were temper rolled the gloss was less than 100 for the coated samples and greater than 100 for the bare galvanized samples. Gloss was found to be a good indicator of the presence of the coating especially on relatively reflective surfaces. This particular version of the coating could also be removed from the strip or formed parts using hot alkaline cleaners typically used to remove oil and processing fluids from metal strip.

What is claimed is:

1. A composite material comprising a metallic substrate and a coating on at least one side of the metallic substrate, wherein the coating comprises an acrylic or styrene-acrylic based polymer and has a dried thickness of less than about 0.2 mils, wherein the polymer has a molecular weight of 125,000 to 1,000,000, a glass transition temperature (Tg) of 65-80° C., and comprises 90-100 wt. % of the total solids in the coating, and further wherein the composite material is formable into a 1 inch deep drawn modified Swift cup without galling, flaking, peeling, or powdering, and the coating has a coefficient of friction of less than 0.5 and a weight of 50 to 350 mg/sq ft.

2. The composite material of claim 1 where the coating forms a continuous film on the metallic substrate.

3. The composite material of claim 1, wherein the coating additionally comprises a surfactant/wetting agent at about 2 wt. % or less of the coating.

4. The composite material of claim 1, wherein the coating additionally comprises one or more of the following additives:
  a) a plasticizer selected from the group consisting of phosphate esters, phthalate esters, benzoic acid esters, and fatty acid esters;
  b) a coalescing agent selected from alkyl or aromatic ethers of ethylene glycol or propylene glycol;
  c) paraffin, polyethylene or polyolefin wax additives;
  d) alkali soluble resins (ASRs) selected from the group consisting of rosin adducts, acrylic resins, and styrene/maleic anhydride resins;
  e) polyvalent metal ions;
  f) defoamers;
  g) tints/colorants; and
  h) micron or nano sized particulate; wherein the particulate comprises silver, cerium, lanthanum, zirconium, silicon, yttrium or other rare earth elements.

5. The composite material of claim 1, wherein the composite material can be:
  a) wound onto a mandrel to form a continuous coil; and
  b) bent to a 0T radius (ASTM 4145) without galling, flaking, peeling, or powdering.

6. The composite material of claim 1, wherein the composite material can be temper rolled without flaking or peeling.

7. The composite material of claim 1, wherein the composite material can be further processed using conventional metalworking techniques including welding, forming, stretching, bending, and drawing.

8. The composite material of claim 1, wherein the composite material can be:
  a) further processed using conventional primers, paints, or powder coatings; or
  b) further processed so as to be converted back into a metallic non-composite system using alkaline or solvent cleaning to remove the coating.

9. The composite material of claim 1, wherein the coating has a pencil hardness of H minimum according to ASTM D3363; and the adhesion of the coating to the metallic substrate is rated 5B when tested according to ASTM D3359.

10. The composite material of claim 1, wherein the coating has a thickness of 0.05-0.2 mils.

11. The composite material of claim 1, wherein the coating has a thickness of 0.05-0.1 mils.

12. The composite material of claim 4, wherein the coating additionally comprises alkali soluble resins (ASRs) selected from the group consisting of rosin adducts, acrylic resins, and styrene/maleic anhydride resins.

13. The composite material of claim 4, wherein the coating additionally comprises a coalescing agent selected from alkyl or aromatic ethers of ethylene glycol or propylene glycol.

* * * * *